United States Patent
Babazadeh

(10) Patent No.: US 10,759,520 B2
(45) Date of Patent: Sep. 1, 2020

(54) FLIGHT CONTROL SYSTEM AND METHOD OF USE

(71) Applicant: THE BOEING COMPANY, Chicago, IL (US)

(72) Inventor: Alexander S. Babazadeh, Bothell, WA (US)

(73) Assignee: THE BOEING COMPANY, Chicago, IL (US)

(*) Notice: Subject to any disclaimer, the term of this patent is extended or adjusted under 35 U.S.C. 154(b) by 286 days.

(21) Appl. No.: 15/720,464

(22) Filed: Sep. 29, 2017

(65) Prior Publication Data

US 2019/0100299 A1    Apr. 4, 2019

(51) Int. Cl.
  *B64C 13/50* (2006.01)
  *G05D 1/00* (2006.01)
  *B64C 13/12* (2006.01)
  *G05D 1/08* (2006.01)
  *G05D 1/04* (2006.01)

(52) U.S. Cl.
  CPC ......... *B64C 13/503* (2013.01); *G05D 1/0077* (2013.01); *B64C 13/12* (2013.01); *G05D 1/042* (2013.01); *G05D 1/0808* (2013.01)

(58) Field of Classification Search
  CPC .... B64C 13/12; B64C 13/503; G05D 1/0077; G05D 1/042; G05D 1/0808
  USPC ....................................................... 244/228
  See application file for complete search history.

(56) References Cited

U.S. PATENT DOCUMENTS

| | | |
|---|---|---|
| 5,493,497 A | 2/1996 | Buus |
| 6,443,399 B1 | 9/2002 | Yount et al. |
| 6,561,463 B1 | 5/2003 | Todd et al. |
| 7,182,296 B2 | 2/2007 | Yount et al. |
| 7,421,320 B2 | 9/2008 | Yeh |
| 7,789,345 B2 | 9/2010 | Matsui et al. |

(Continued)

FOREIGN PATENT DOCUMENTS

| | | |
|---|---|---|
| DE | 102011115318 A1 | 4/2013 |
| EP | 0288034 A3 | 10/1988 |

(Continued)

OTHER PUBLICATIONS

European Search Report regarding European Patent Application Serial No. 18195092.4-1204 dated Jan. 18, 2019; pp. 1-13.

(Continued)

*Primary Examiner* — Claude J Brown
(74) *Attorney, Agent, or Firm* — Armstrong Teasdale LLP

(57) ABSTRACT

A flight control system for a flight control surface includes a first actuator control electronics (ACE), a second ACE, a third ACE, a first remote electronics unit (REU), and a second REU. The first ACE is configured to generate a first control signal for the flight control surface. The second ACE is configured to generate a second control signal for the flight control surface. The third ACE is configured to generate a third control signal for the flight control surface. The first REU is coupled to the first ACE and the second ACE, and configured to operate, based on the first control signal and the second control signal, an actuator coupled to the flight control surface. The second REU is coupled to the second ACE and the third ACE, and configured to operate, based on the second control signal and the third control signal, the actuator.

20 Claims, 7 Drawing Sheets

(56) References Cited

U.S. PATENT DOCUMENTS

| | | | |
|---|---|---|---|
| 8,453,160 B2 * | 5/2013 | Sunderland | G05B 19/0428 719/312 |
| 8,534,599 B2 | 9/2013 | Noll et al. | |
| 8,818,574 B2 | 8/2014 | Fukui et al. | |
| 8,818,575 B2 * | 8/2014 | Lin | G05D 1/0077 701/3 |
| 8,935,015 B2 | 1/2015 | Olsoe et al. | |
| 9,540,096 B2 | 1/2017 | Lin et al. | |
| 2006/0289696 A1 | 12/2006 | Hanlon et al. | |
| 2007/0007385 A1 | 1/2007 | Potter et al. | |
| 2007/0164166 A1 * | 7/2007 | Hirvonen | G05D 1/0077 244/175 |
| 2007/0164168 A1 * | 7/2007 | Hirvonen | B64C 13/04 244/223 |
| 2010/0318245 A1 | 12/2010 | Nakagawa et al. | |
| 2011/0251739 A1 * | 10/2011 | Tomas | G05B 9/03 701/3 |
| 2011/0290938 A1 | 12/2011 | Matsui et al. | |
| 2012/0290153 A1 * | 11/2012 | Olsoe | B64C 13/505 701/3 |
| 2013/0311006 A1 * | 11/2013 | Ahmad | B64C 13/505 701/3 |

FOREIGN PATENT DOCUMENTS

| | | | | |
|---|---|---|---|---|
| EP | 2505496 A2 * | 10/2012 | | B64C 13/503 |
| EP | 2505496 A2 | 10/2012 | | |
| EP | 2924529 A1 * | 9/2015 | | |
| EP | 2924529 A1 | 9/2015 | | |
| WO | WO-2018215649 A1 * | 11/2018 | | B64C 13/503 |

OTHER PUBLICATIONS

Mare, Jean-Charles et al., Review on Signal-by-wire and power-by-wire actuation for more electric aircraft; Chinese Journal of Aeronautics, Apr. 20, 2017, pp. 857-870, vol. 30, No. 3, Elsevier, Amsterdam, NL.

Extended European Search Report regarding European Patent Application Serial No. 18195092.4 dated Apr. 11, 2019; pp. 1-13.

* cited by examiner

FLIGHT CONTROL SYSTEM AND METHOD OF USE

BACKGROUND

The field of the disclosure relates generally to flight control systems and, more specifically, to a flight control system for controlling a horizontal stabilizer of an aircraft.

At least some known flight control systems include actuator control electronics (ACE) that collect sensor input and data from various other avionics to determine how to command a given flight control surface. The ACE generally includes a processing device that responds directly to pilot input, to sensor input, or to data received from another flight control computer to generate a control signal to control the flight control surface. The control signal generally commands a direction and rate of rotation or actuation, and is received by a remote electronics unit (REU) that actually controls an actuator, e.g., a hydraulic actuator or an electric actuator. The REU carries out the commanded rotation or actuation for a period of time or until a new command is received. In alternative embodiments, the control signal commands a position and the REU maintains the flight control surface in that position using a closed-loop position control system.

Some known flight control systems utilize redundant ACE to independently determine and agree on how to command a particular flight control surface. For example, a horizontal stabilizer, which provides pitch control of the aircraft, has a high level of authority over the aircraft and, therefore, commands for control of the horizontal stabilizer are often subject to redundancy requirements to ensure proper control of the flight control surface during normal operation as well as in failure conditions. Failure conditions include, for example, a failure of an ACE or REU. During such a failure, the flight control system must maintain control of the flight control surface, e.g., the horizontal stabilizer. Accordingly, many known flight control systems include redundant flight control paths that can maintain control through failure of an ACE, an REU, a stabilizer control module (STCM), or any other component of the flight control system. Such flight control systems typically include redundant ACE, REU, and STCM.

In contrast, for example, at least some aircraft include multiple elevators, i.e., a left elevator and a right elevator. One elevator might have multiple actuators, each actuator having an ACE and an REU. Given that the authority of the elevators is divided among numerous flight control surfaces and potentially multiple actuators, the REU is generally not required to rely on multiple ACE for command.

BRIEF DESCRIPTION

According to one aspect of the present disclosure, a flight control system for a flight control surface is provided. The flight control system includes a first actuator control electronics (ACE), a second ACE, a third ACE, a first remote electronics unit (REU), and a second REU. The first ACE is configured to generate a first control signal for the flight control surface. The second ACE is configured to generate a second control signal for the flight control surface. The third ACE is configured to generate a third control signal for the flight control surface. The first REU is coupled to the first ACE and the second ACE, and configured to operate, based on the first control signal and the second control signal, an actuator coupled to the flight control surface. The second REU is coupled to the second ACE and the third ACE, and configured to operate, based on the second control signal and the third control signal, the actuator.

According to another aspect of the present disclosure, a method of using a flight control system to operate a flight control surface is provided. The method includes receiving, at a first REU, a first control signal, from a first ACE, for operating an actuator coupled to the flight control surface. The method includes receiving, at a second REU, a second control signal, from a second ACE, for operating the actuator. The method includes transmitting the second control signal from the second REU to the first REU. The method includes operating, by the first REU, the actuator based on the first control signal and the second control signal.

According to yet another aspect of the present disclosure, a flight control system for a horizontal stabilizer is provided. The flight control system includes an actuator coupled to the horizontal stabilizer, a first REU, and a second REU. The first REU is coupled to the actuator and is configured to operate the actuator based on respective control signals originating from at least two actuator control electronics (ACE). The second REU is coupled to the actuator and is configured to operate the actuator, independent of the first REU, based on respective control signals originating from at least two ACE, the second REU further coupled to the first REU and further configured to transmit a control signal, received from an ACE, to the first REU.

The features, functions, and advantages that have been discussed can be achieved independently in various embodiments or may be combined in yet other embodiments further details of which can be seen with reference to the following description and drawings.

DETAILED DESCRIPTION

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
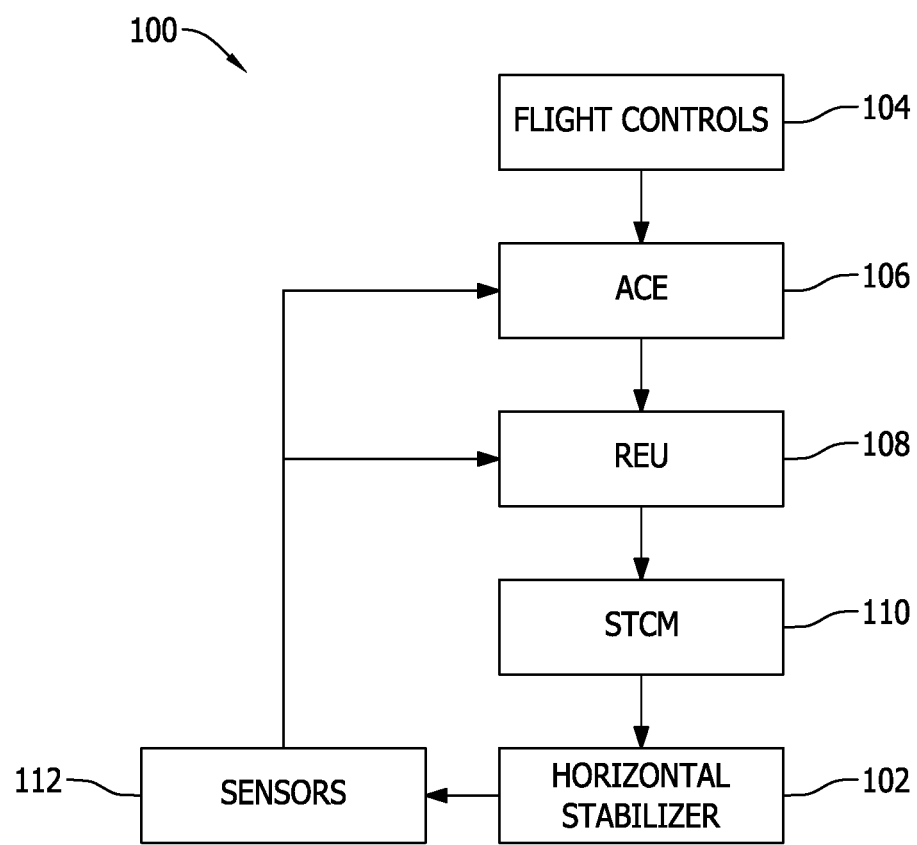
FIG. 1 is a functional block diagram of an exemplary flight control system for a horizontal stabilizer.

FIG. 1 is a functional block diagram of an exemplary flight control system 100 for operating a horizontal stabilizer 102. Flight control system 100 includes flight controls 104, an ACE 106, an REU 108, a stabilizer control module (STCM) 110, and sensors 112.

Flight controls 104 are a physical interface for a pilot to input flight control commands, including, for example, pitch, roll, and yaw, as well as other control inputs, such as, for example, trim and throttle. Control inputs received at flight controls 104 are transmitted to ACE 106. ACE 106 may receive control inputs from flight controls 104 as well as data from sensors 112 and other avionics modules or flight computers. ACE 106 generates control signals based on these various control inputs and data for operating a flight control surface, such as, for example, horizontal stabilizer 102. Generally, the generated control signal includes a rate of rotation or actuation of the actuator coupled to the flight control surface. In alternative embodiments, the generated control signal may include a commanded position for the flight control surface.

ACE 106 transmits the control signal to REU 108, which controls the STCM 110, including the electric actuator or hydraulic actuator (neither shown) coupled to horizontal stabilizer 102. REU 108 applies power to STCM 110 based on the control signal. In many aircraft, REU 108 requires control signals from two independent ACE 106 to control STCM 110. Such redundancy ensures the integrity of control signals REU 108 receives for controlling horizontal stabilizer 102. In certain embodiments, REU 108 controls electrical power using relays, switches, or other power electronics that, for example, supply power to STCM 110. In other embodiments, REU 108 controls hydraulic power to STCM 110 using solenoids, valves, and pumps, for example. In response, STCM 110 actuates horizontal stabilizer 102.

Sensors 112 provide feedback to ACE 106, REU 108, or both to enable closed loop control of horizontal stabilizer 102. For example, sensors 112 may include one or more position sensors configured to detect actuation of horizontal stabilizer 102. Sensors 112 then transmit a sensor signal to ACE 106, REU 108, or both.

A typical flight control system for horizontal stabilizer 102 defines two independent flight control paths, each with two ACE 106, an REU 108, and an STCM 110 for actuating horizontal stabilizer 102. Consequently, such a flight control system for horizontal stabilizer 102 would include four ACE 106, two REU 108, and two STCM 110. In this manner, failure of an ACE 106, REU 108, or STCM 110 in one flight control path would render that flight control path unusable, but the redundant flight control path would maintain control of horizontal stabilizer 102 independent of the failed flight control path. It is realized herein that a fail-safe flight control system may be achieved using three ACE 106 instead of four, thereby eliminating the additional weight, bulk, cost, and complexity of the fourth ACE 106.

Figure 2:
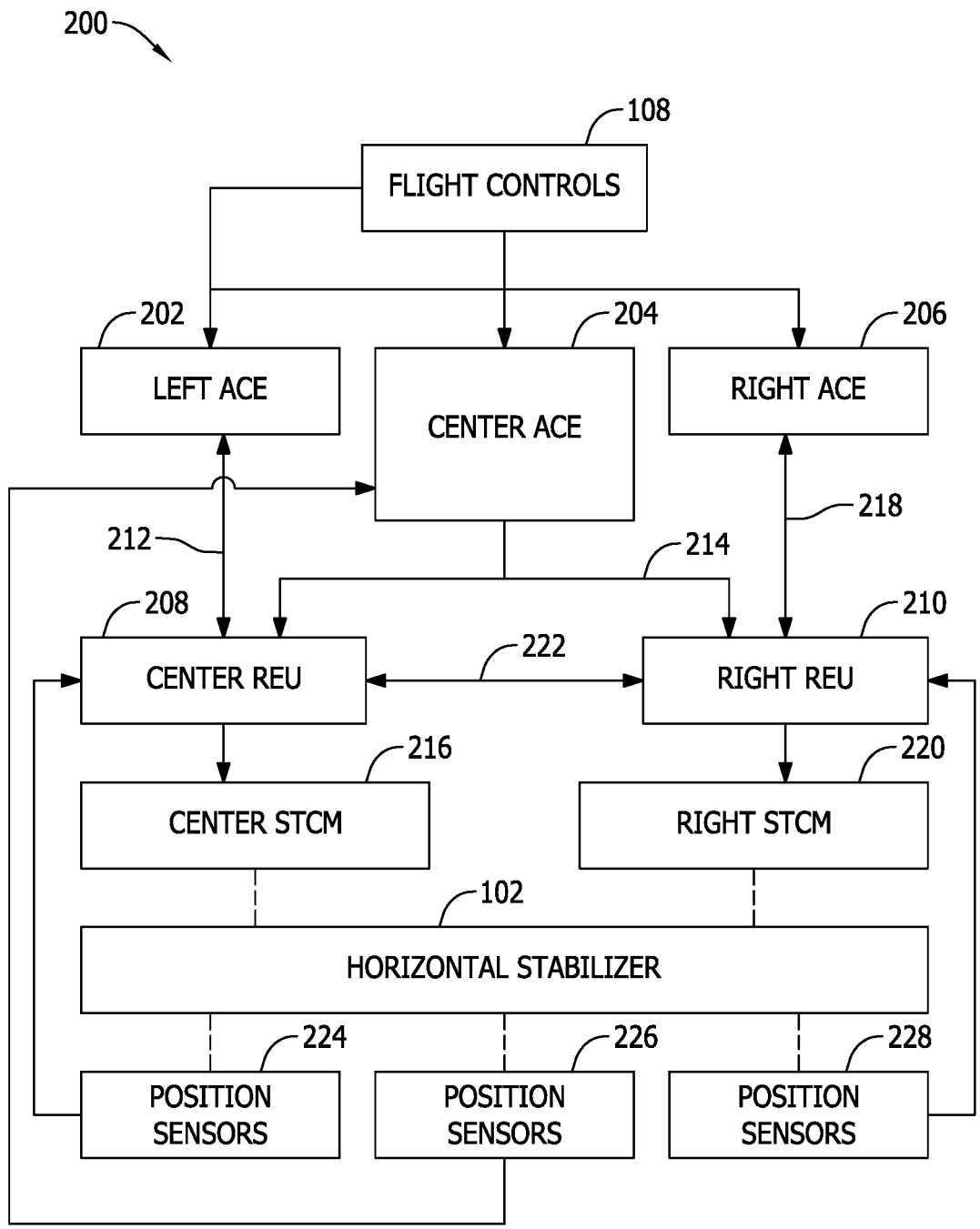
FIG. 2 is a schematic diagram of an exemplary flight control system for a horizontal stabilizer.

FIG. 2 is a schematic diagram of an exemplary flight control system 200 for horizontal stabilizer 102. Flight control system 200 includes a left ACE 202, a center ACE 204, and a right ACE 206, each of which is coupled to flight controls 104. Left ACE 202, center ACE 204, and right ACE 206 each include a computing system that receives various inputs from flight controls 104, sensors 112, and other avionics modules to independently generate control signals for commanding horizontal stabilizer 102. Left ACE 202, center ACE 204, and right ACE 206 are communicatively isolated from each other to prevent any errors in processing or data of one ACE from corrupting the processing or data of the other ACE. Such errors may occur as a result of, for example, a hardware or software failure in one of left ACE 202, center ACE 204, and right ACE 206, an error in data received by one of left ACE 202, center ACE 204, and right ACE 206, or an error in the communication channels to and from left ACE 202, center ACE 204, and right ACE 206.

Flight control system 200 includes a center REU 208 and a right REU 210. Control of horizontal stabilizer 102 is maintained by either of center REU 208 and right REU 210. Each of center REU 208 and right REU 210 requires two control signals independently generated by two ACE. Generally, the two control signals must agree in their commanded actuation of horizontal stabilizer 102 within some tolerance level. The requirement for two agreeing control signals ensures center REU 208 and right REU 210 command horizontal stabilizer 102 based on trusted flight control inputs, sensor data, and data from other avionics modules.

Center REU 208 is coupled to left ACE 202 and center ACE 204. Center REU 208 is configured to control horizontal stabilizer 102 based on control signals from left ACE 202 and center ACE 204. More specifically, left ACE 202 communicates with center REU 208 over a data bus 212. Left ACE 202 transmits a control signal over, for example, data bus 212, including, for example, a rate of rotation, a rate of actuation, or a commanded position for horizontal stabilizer 102. Likewise, center ACE 204 communicates control signals to center REU 208 using discrete outputs 214 of center ACE 204. During normal operation, center REU 208 controls a center STCM 216 based on a combination of the control signal from left ACE 202 and the control signal from center ACE 204.

Similarly, right REU 210 is coupled to right ACE 206 and center ACE 204. Right REU 210 is configured to control horizontal stabilizer 102 based on control signals from right ACE 206 and center ACE 204. More specifically, right ACE 206 communicates with right REU 210 over, for example, a data bus 218. Right ACE 206 transmits a control signal over data bus 218, including, for example, a rate of rotation, a rate of actuation, or a commanded position for horizontal stabilizer 102. Likewise, center ACE 204 communicates control signals to right REU 210 using discrete outputs 214. During normal operation, right REU 210 controls a right STCM 220 based on a combination of the control signal from right ACE 206 and the control signal from center ACE 204.

In alternative embodiments, data bus 212, discrete outputs 214, and data bus 218 may be replaced by any communication channel suitable for carrying the necessary data among left ACE 202, center ACE 204, right ACE 206, center REU 208, and right REU 210. For example, discrete outputs 214 from center ACE 204 may include a multi-discrete coded output, such as, a three bit analog signal. Likewise, for example, data bus 212 may carry a large amount of data from left ACE 202, including, for example, a rate of rotation, a rate of actuation, a direction of actuation, or a commanded position, and center REU 208 may transmit various feedback data over data bus 212 to left ACE 202.

Center STCM 216 and right STCM 220 each include valves, solenoids, relays, or other switching components for applying power to an actuator coupled to horizontal stabilizer 102. For example, in embodiments where horizontal stabilizer 102 is actuated by a hydraulic actuator, center STCM 216 and right STCM 220 include valves and solenoids for controlling hydraulic pressure to the actuator. Likewise, in embodiments where horizontal stabilizer 102 is actuated by an electric actuator, center STCM 216 and right STCM 220 includes relays, switches, and other power electronics for controlling electrical power to the actuator. Center REU 208 translates, for example, a rate of rotation or rate of actuation command it receives from left ACE 202 and center ACE 204 to one or more signals for controlling power applied to various valves, solenoids, relays, and switches of center STCM 216, and thereby operates the actuator coupled to horizontal stabilizer 102. Likewise, right REU 210 translates, for example, a rate of rotation or rate of actuation command it receives from right ACE 206 and center ACE 204 to one or more signals for controlling power applied to various valves, solenoids, relays, and switches of right STCM 220, and thereby operates the actuator coupled to horizontal stabilizer 102.

In the event an error occurs in left ACE 202 or center REU 208 is otherwise unable to receive a valid control signal over data bus 212 from left ACE 202, right REU 210 is configured to control right STCM 220 based on control signals received from center ACE 204 and right ACE 206. Likewise, in the event an error occurs in right ACE 206 or right REU 210 is otherwise unable to receive a valid control signal over data bus 218 from right ACE 206, center REU 208 is configured to control center STCM 216 based on control signals received from left ACE 202 and center ACE 204. In this manner, flight control system 200 maintains control of horizontal stabilizer 102 in the event either one of left ACE 202 or right ACE 206 experiences a failure.

Center ACE 204 is a shared ACE that transmits control signals to both center REU 208 and right REU 210, as opposed to center REU 208 and right REU 210 each having distinct ACE devices in their respective flight control paths. In the event center ACE 204 fails or is unable to communicate a valid control signal to either of center REU 208 and right REU 210 using discrete outputs 214, only left ACE 202 and right ACE 206 are able to generate valid control signals. In such a failure condition, neither center REU 208 nor right REU 210 receives valid control signals directly from two independent ACE. Flight control system 200 further includes a communication link 222 between center REU 208 and right REU 210. Communications link 222 is sometimes referred to as an alternate arm path. Center REU 208 and right REU 210 are configured to communicate, i.e., transmit and receive, data from respective control signals to the other REU over communication link 222. For example, when center ACE 204 fails and center REU 208 and right REU 210 each receive only one valid control signal from left ACE 202 and right ACE 206, center REU 208 and right REU 210 communicate their received control signals to each other. For example, if center REU 208 detects center ACE 204 is not transmitting a valid control signal over discrete outputs 214, center REU 208 receives at least a portion of the control signal originating from right ACE 206 and relayed by right REU 210 over communication link 222.

In certain embodiments, if a failure occurs in left ACE 202 or right ACE 206, center REU 208 and right REU 210 may similarly share, over communication link 222, received control signals originating from their respective un-failed ACE devices. By utilizing communication link 222, both center REU 208 and right REU 210 can continue operating through a failure of either one of left ACE 202 and right ACE 206.

Flight control system 200 includes position sensors 224, 226, and 228 coupled to horizontal stabilizer and configured to measure the position of the horizontal stabilizer. Position sensors 224 and 228 provide position feedback of horizontal stabilizer 102 to center REU 208 and right REU 210, respectively. Position sensor 226 provides position feedback of horizontal stabilizer 102 to center ACE 204. In certain embodiments, data received at center REU 208 from position sensor 224 may be relayed to right REU 210 over communication link 222. Likewise, data received at right REU 210 from position sensor 228 may be relayed to right REU 208 over communication link 222.

Figure 3:
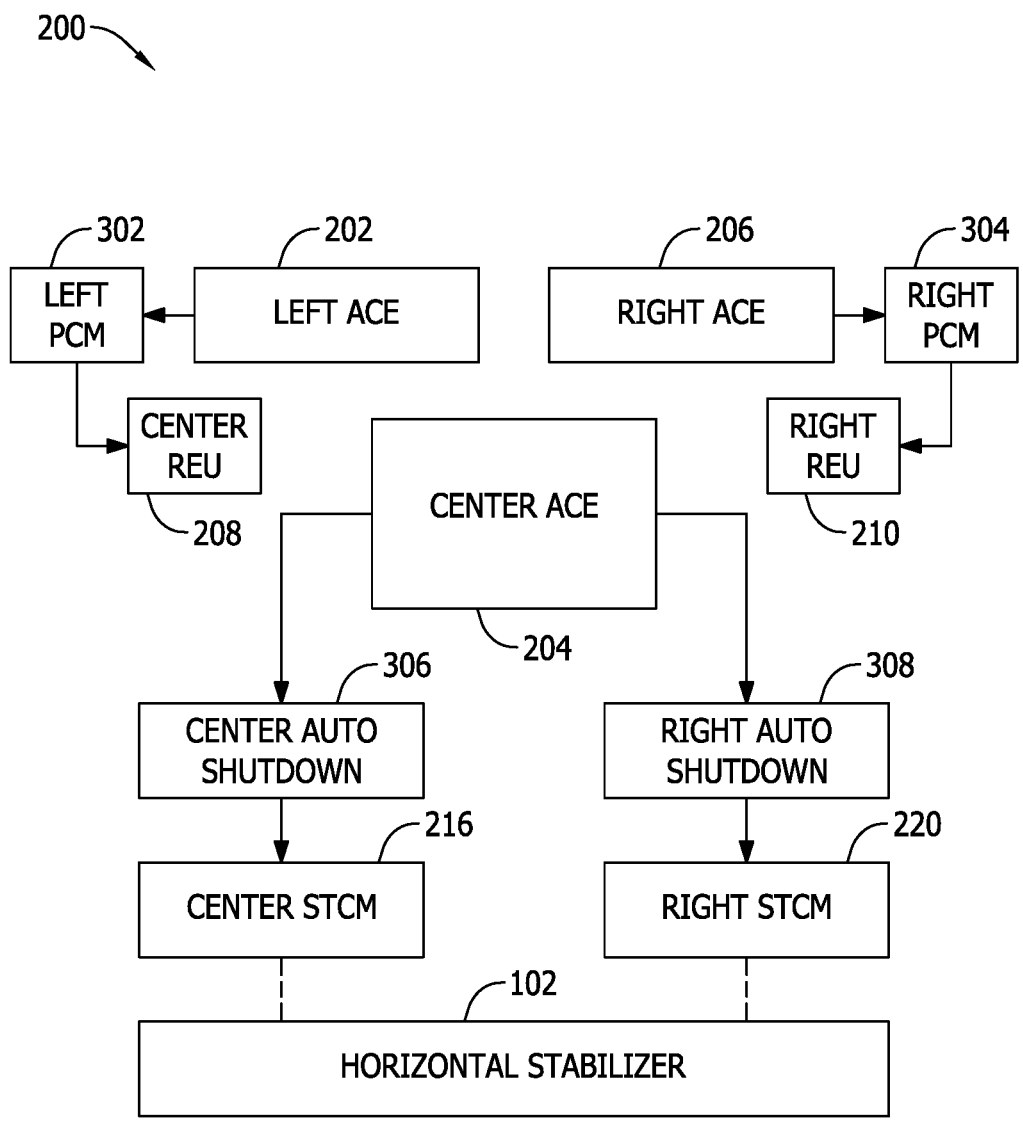
FIG. 3 is another schematic diagram of the flight control system shown in FIG. 2.

FIG. 3 is another block diagram of flight control system 200. Flight control system 200 includes a left power commissioning module (PCM) 302 and a right PCM 304. Left PCM 302 is coupled to left ACE 202 and is configured to regulate power delivered to center REU 208. For example, if left ACE 202 determines center REU 208 is malfunctioning or should otherwise be disabled, or that horizontal stabilizer 102 is not actuating properly, left ACE 202 transmits a command to left PCM 302 to remove power from center REU 208. Likewise, right PCM 304 is coupled to right ACE 206 and is configured to regulate power delivered to right REU 210. For example, if right ACE 206 determines right REU 210 is malfunctioning or should otherwise be disabled, or that horizontal stabilizer 102 is not actuating properly, right ACE 206 transmits a command to right PCM 304 to remove power from right REU 210.

Flight control system 200 includes a center auto shutdown module 306 and a right auto shutdown module 308. Center auto shutdown module 306 is coupled to center STCM 216 and is configured to enable and disable center STCM 216 by removing electrical or hydraulic power. Likewise, right auto shutdown module 308 is coupled to right STCM 220 and is configured to enable and disable right STCM 220. Center auto shutdown module 306 and right auto shutdown module 308 are each coupled to center ACE 204. If center ACE 204 determines horizontal stabilizer 102 is not actuating properly, or that left ACE 202 or center REU 208 have failed or malfunctioned, center ACE 204 may command center auto shutdown module 306 to disable center STCM 216 by removing electrical or hydraulic power. Likewise, if center ACE 204 determines right ACE 206 or right REU 210 have failed or malfunctioned, center ACE 204 may command right auto shutdown module 308 to disable right STCM 220.

Left PCM 302, right PCM 304, center auto shutdown module 306, and right auto shutdown module 308 provide redundant shutdown capability for any of left ACE 202, center ACE 204, and right ACE 206 to disable a faulty flight control path while maintaining control of horizontal stabilizer 102 through the other flight control path.

Figure 4:
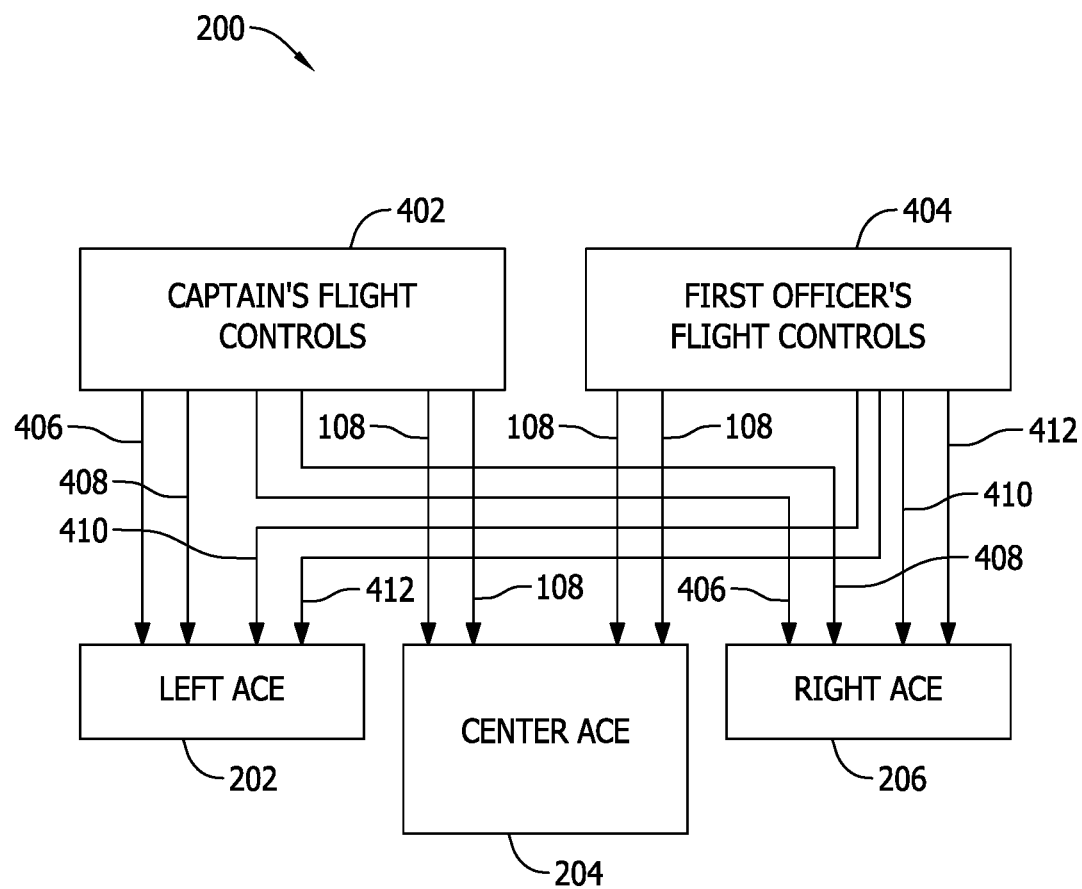
FIG. 4 is another schematic diagram of the flight control system shown in FIGS. 2-3.

FIG. 4 is another block diagram of flight control system 200, including left ACE 202, center ACE 204, and right ACE 206. Flight control system 200 includes captain's flight controls 402 and first officer's flight controls 404, each of which may include for example, a stick, yolk, or wheel integrated with various flight control switches and/or buttons, such as, for example, trim switches.

With respect to horizontal stabilizer 102, captain's flight controls 402 transmit, for example, a trim up discrete 406 and a trim down discrete 408 to left ACE 202. Trim up discrete 406 and trim down discrete 408 are duplicated for right ACE 206. Similarly, first officer's flight controls 404 transmit, for example, a trim up discrete 410 and a trim down discrete 412 to right ACE 206. Trim up discrete 410 and trim down discrete 412 likewise are duplicated for left ACE 202.

Captain's flight controls 402 also transmit an arm up discrete 414 and an arm down discrete 416 to center ACE 204. First officer's flight controls 404 similarly transmit an arm up discrete 418 and an arm down discrete 420 to center ACE 204.

Left ACE 202 and right ACE 206 are each configured to receive inputs from captain's flight controls 402 and first officer's flight controls 404 and independently determine the appropriate control for horizontal stabilizer 102. Similarly, center ACE 204 receives the arm inputs from captain's flight controls 402 and first officer's flight controls 404 and determines the appropriate control for horizontal stabilizer 102 independent of the computations carried out by left ACE 202 and right ACE 206.

Figure 5:
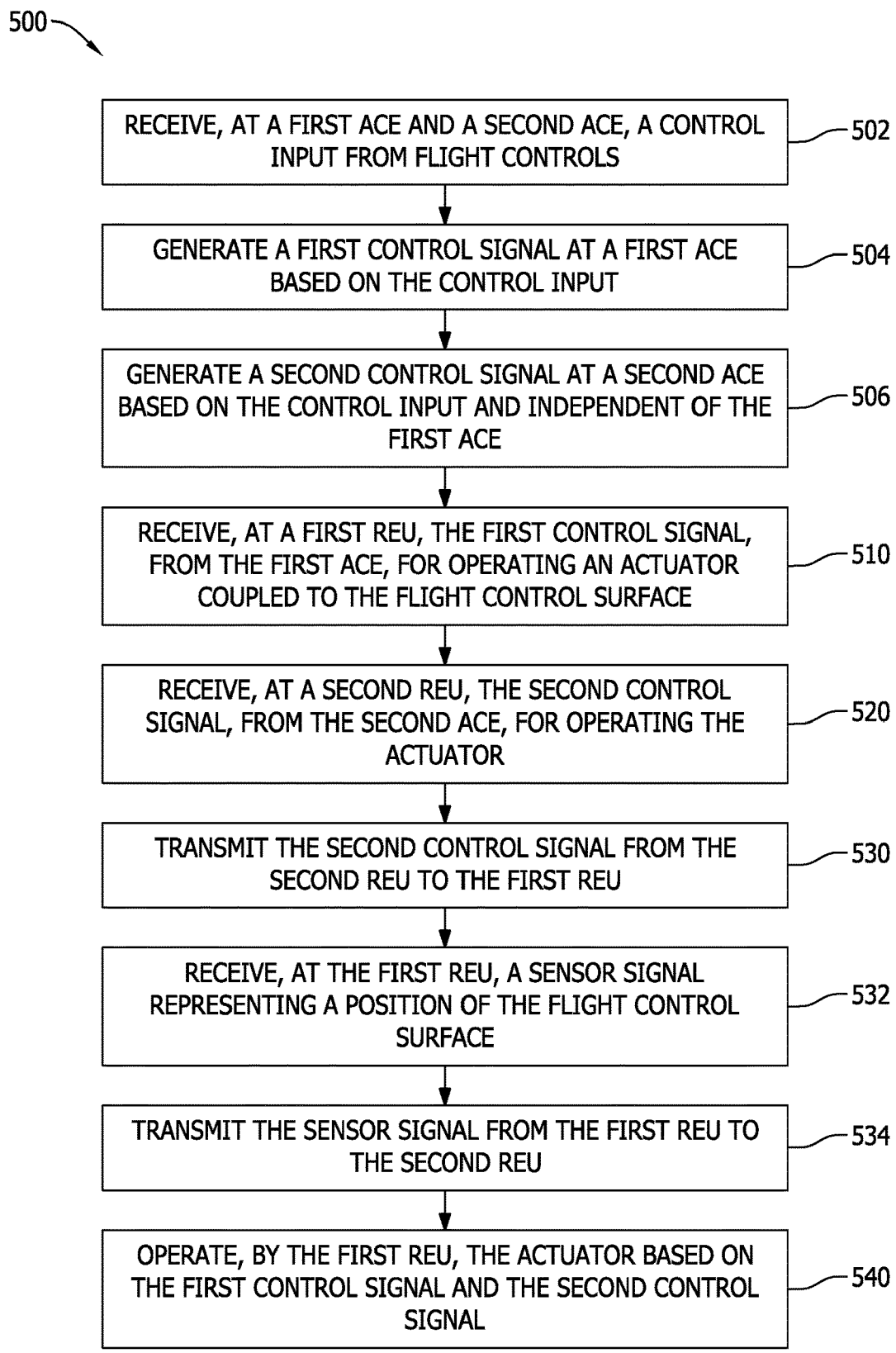
FIG. 5 is a flow diagram of a method of operating a flight control system to control a flight control surface.
Figure 6:
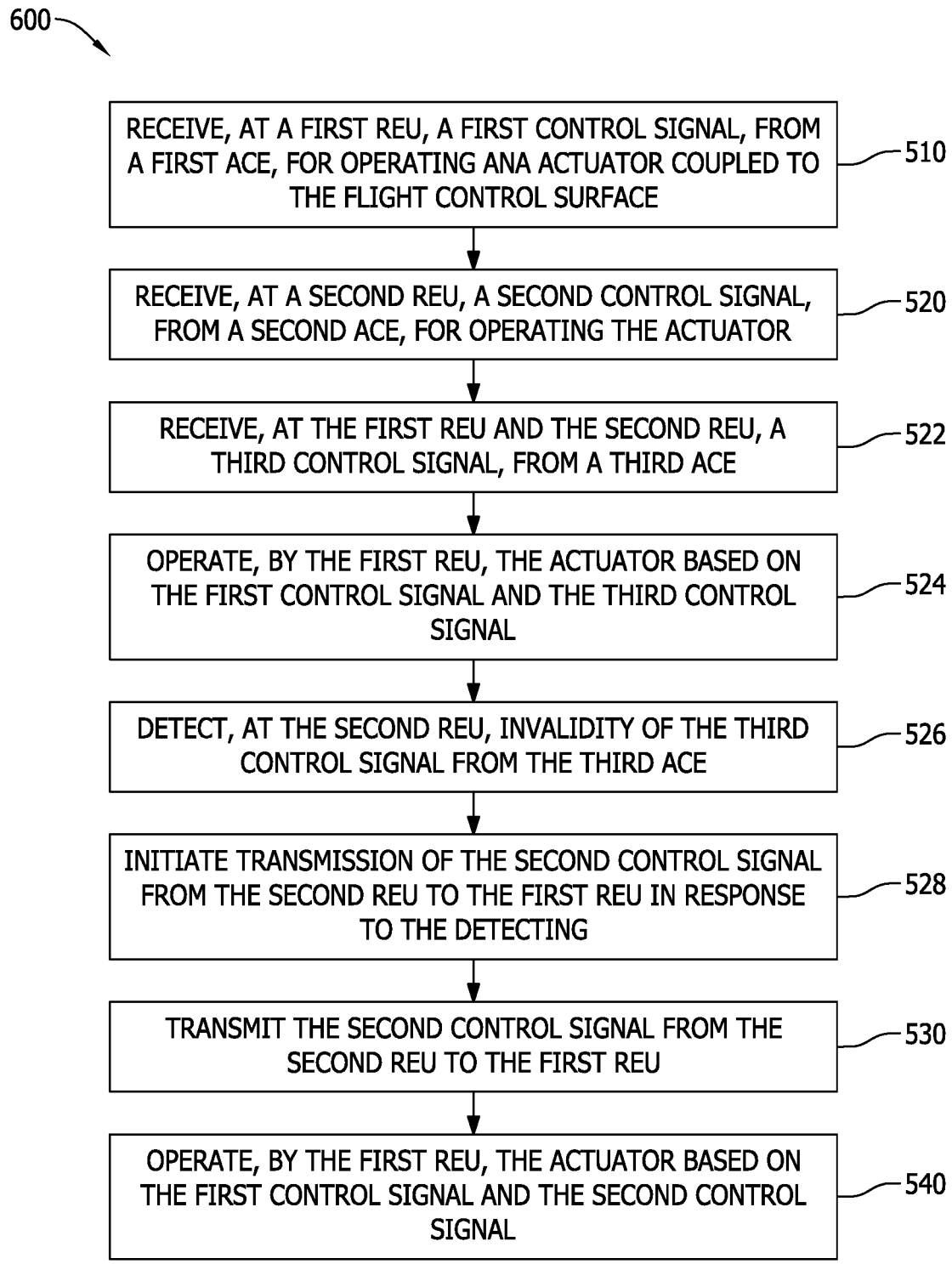
FIG. 6 is a flow diagram of another method of operating a flight control system to control a flight control surface.
Figure 7:
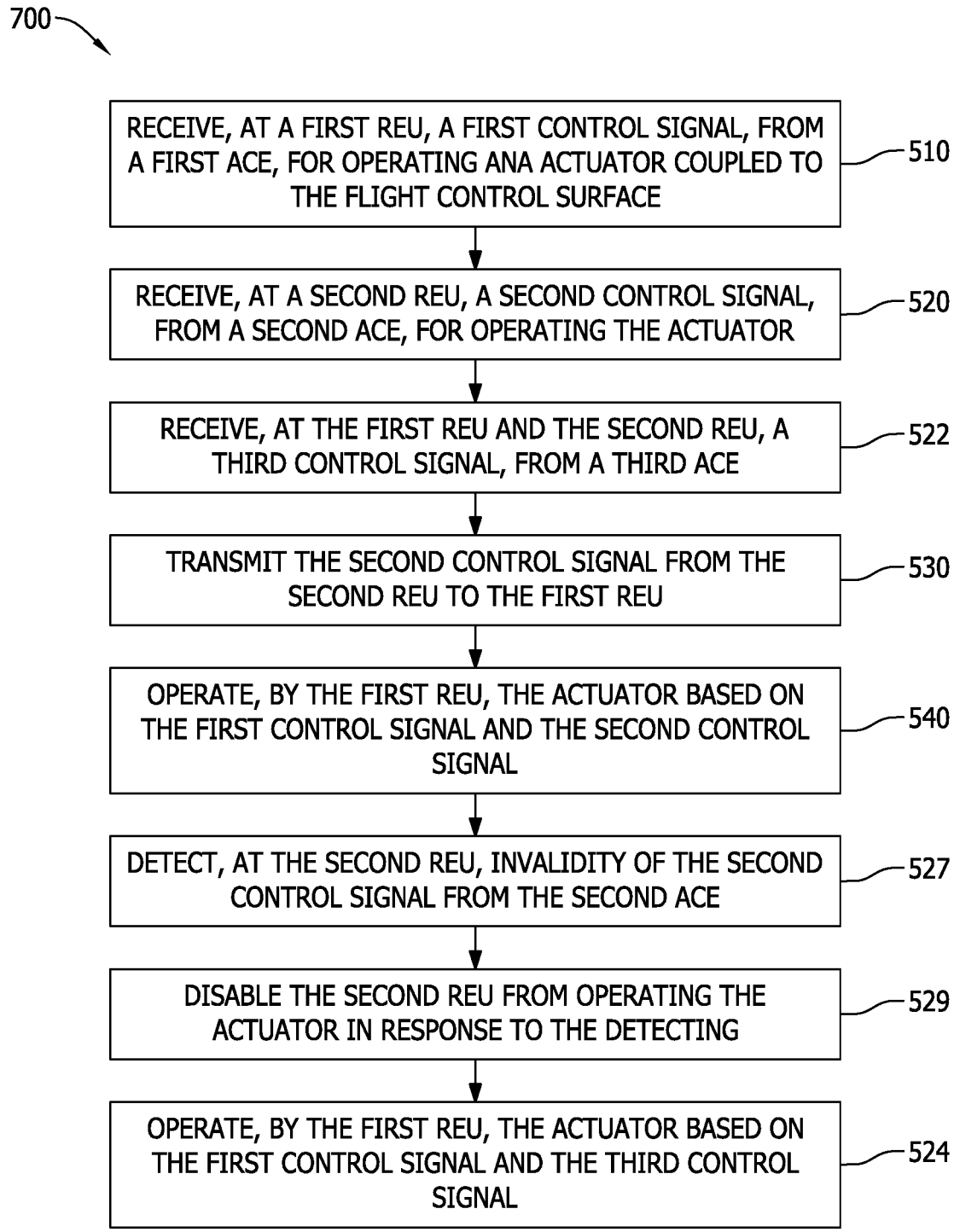
FIG. 7 is a flow diagram of yet another method of operating a flight control system to control a flight control surface.

FIG. 5 is a flow diagram of an exemplary method 500 of using flight control system 200, shown in FIGS. 2-4, to operate a flight control surface, such as, for example, horizontal stabilizer 102. Likewise, FIGS. 6 and 7 are flow diagrams of alternative methods 600 and 700, respectively, of using flight control system 200. A first REU, e.g., center REU 208, receives 510 a first control signal from a first ACE, e.g., left ACE 202. The first control signal represents commands for operating an actuator coupled to the flight control surface. A second REU, e.g., right REU 210, receives 520 a second control signal from a second ACE, e.g., right ACE 206. The second control signal also represents commands for operating the actuator. The first ACE and the second ACE, in certain embodiments, receive 502 a control input from flight controls. The first ACE generates 504 the first control signal based on the control input. The second ACE generates 506 the second control signal based on the control input and independent of the first ACE.

The second REU, e.g., right REU 210, transmits 530 the second control signal to the first REU, e.g., center REU 208. The second control signal is transmitted 530 over communication link 222 between center REU 208 and right REU 210. Center REU 208 then operates 540 the actuator based on the first control signal received from left ACE 202 and the second control signal, originating from right ACE 206, and received from right REU 210.

In an alternative embodiment, center REU 208 may transmit 530 the first control signal over communication link 222 to right REU 210. Right REU 210 then operates 540 the actuator based on the second control signal received from right ACE 206 and the first control signal, originating from left ACE 202, and received from center REU 208.

Center REU 208 and right REU 210 also receive 522 a third control signal from a third ACE, e.g., center ACE 204, as shown in method 600 of FIG. 6. Under normal operating conditions, center REU 208 operates 524 the actuator based on the first control signal from left ACE 202 and the third control signal from center ACE 204. Likewise, right REU 210 operates the actuator based on the second control signal from right ACE 206 and the third control signal from center ACE 204.

The first and second REUs, e.g., center REU 208 and right REU 210, are each configured to detect the invalidity of control signals from their respective ACE. For example, right REU 210 is configured to detect 526 invalidity of the third control signal from the third ACE, e.g., center ACE 204. In response to the detection, a transmission 530 of the second control signal from right REU 210 to center REU 208 is initiated 528. Similarly, the detection may be made by center REU 208, and the transmission of the control signal may be in either direction, from center REU 208 to right REU 210, or from right REU 210 to center REU 208. Further, as shown in method 700 shown in FIG. 7, right REU 210 may detect 527 invalidity of the second control signal from the second ACE, e.g., right ACE 206. In such a failure condition, right REU 210 and, possibly, right STCM 220, are disabled 529.

In certain embodiments, first ACE, second ACE, and third ACE, e.g., left ACE 202, right ACE 206, and center ACE 204, receive 502 control input from flight controls 104. Left ACE 202, right ACE 206, and center ACE 204 generate 504 and 506 their respective control signals independently and based on at least the control input.

In certain embodiments, method 500 includes receiving 532 a sensor signal from one or more positions sensors 224, 226, and 228. For example, center REU 208 receives 532 a sensor signal from position sensor 224 representing the position of horizontal stabilizer 102. Center REU 208 may, under certain conditions, for example, during a failure of another position sensor, transmit 534 the sensor signal originating from position sensor 224 from center REU 208 to right REU 210 over communication link 222.

The above described embodiments of flight control systems and methods of use provide a flight control system for a horizontal stabilizer that includes redundant flight control paths utilizing three ACE devices instead of four. Such embodiments also provide a communication link between REU devices to enable the sharing of data between the parallel flight control paths, particularly during failure conditions. For example, when a shared ACE fails, the two REUs share control signals with each other to enable one or both REU to maintain control of the horizontal stabilizer with the requisite two control signals originating from two independent ACE. The communication link between REU devices further enables the sharing of other data between REUs, including, for example, sensor data for the horizontal stabilizer.

An exemplary technical effect of the methods, systems, and apparatus described herein includes at least one of: (a) improving fault performance by utilizing an alternate communication link between REU devices; (b) reducing weight and cost by elimination of one ACE device for controlling the horizontal stabilizer; and/or (c) improving fault tolerance by sharing of signals and data between REU devices.

Some embodiments involve the use of one or more electronic processing or computing devices. As used herein, the terms "processor" and "computer" and related terms, e.g., "processing device", "computing device", and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above examples are exemplary only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc—read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used.

Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A flight control system for a flight control surface, said flight control system comprising:
    a first actuator control electronics (ACE) configured to generate a first control signal for the flight control surface;
    a second ACE configured to generate a second control signal for the flight control surface;
    a third ACE configured to generate a third control signal for the flight control surface;
    a first remote electronics unit (REU) coupled to said first ACE and said second ACE, and configured to operate, based on the first control signal and the second control signal, an actuator coupled to the flight control surface; and
    a second REU coupled to said second ACE and said third ACE, and configured to operate, based on the second control signal and the third control signal, the actuator.

2. The flight control system of claim 1, wherein said first ACE, said second ACE, and said third ACE are respectively communicatively isolated from each other.

3. The flight control system of claim 1, wherein said first REU is further coupled to said second REU by an alternate path.

4. The flight control system of claim 3, wherein said first REU is further configured to transmit at least a portion of the first control signal over said alternate path to said second REU.

5. The flight control system of claim 4, wherein said first REU is further configured to transmit the at least a portion of the first control signal over said alternate path to said second REU when said second REU does not receive the second control signal from said second ACE, said second REU further configured to operate the actuator based on the third control signal and the at least a portion of the first control signal received over said alternate path.

6. The flight control system of claim 1, wherein said first REU and said second REU are each further configured to operate the actuator only upon receipt of respective control signals originating from at least two of said first ACE, said second ACE, and said third ACE.

7. The flight control system of claim 6, wherein said first REU and said second REU are each further configured to operate the actuator independent of each other.

8. A method of using a flight control system to operate a flight control surface, said method comprising:
    receiving, at a first remote electronics unit (REU), a first control signal, from a first actuator control electronics (ACE), for operating an actuator coupled to the flight control surface;
    receiving, at a second REU, a second control signal, from a second ACE, for operating the actuator;
    transmitting the second control signal from the second REU to the first REU; and
    operating, by the first REU, the actuator based on the first control signal and the second control signal.

9. The method of claim 8, further comprising:
    receiving, at the first REU and the second REU, a third control signal, from a third ACE; and operating, by the first REU, the actuator based on the first control signal and the third control signal.

10. The method of claim 9, further comprising:
detecting, at the second REU, invalidity of the third control signal from the third ACE; and
initiating transmission of the second control signal from the second REU to the first REU in response to the detecting.

11. The method of claim 9, further comprising:
detecting, at the second REU, invalidity of the second control signal from the second ACE; and
disabling the second REU from operating the actuator m response to the detecting.

12. The method of claim 8, further comprising:
generating the first control signal at the first ACE; and
generating the second control signal at the second ACE independent of the first ACE.

13. The method of claim 12, further comprising receiving, at the first ACE and the second ACE, a control input from flight controls, wherein the first control signal and the second control signal are independently generated based on the control input.

14. The method of claim 8, further comprising:
receiving, at the first REU, a sensor signal representing a position of the flight control surface; and
transmitting the sensor signal to the second REU.

15. A flight control system for a horizontal stabilizer, said flight control system comprising:
an actuator coupled to the horizontal stabilizer;
a first remote electronics unit (REU) coupled to said actuator and configured to operate said actuator based on respective control signals originating from at least two actuator control electronics (ACE); and
a second REU coupled to said actuator and configured to operate said actuator, independent of said first REU, based on respective control signals originating from at least two ACE, said second REU further coupled to said first REU and further configured to transmit a control signal, received from an ACE, to said first REU.

16. The flight control system of claim 15, further comprising a sensor coupled to the horizontal stabilizer and configured to detect actuation thereof, and to transmit a sensor signal representative of the actuation to said first REU, said first REU further configured to operate said actuator based on the sensor signal.

17. The flight control system of claim 16, wherein said first REU is further configured to transmit the sensor signal to said second REU.

18. The flight control system of claim 15, further comprising:
a first ACE coupled to said first REU and configured to transmit a first control signal thereto;
a second ACE coupled to said first REU and said second REU, and configured to transmit a second control signal to both said first REU and said second REU; and
a third ACE coupled to said second REU and configured to transmit a third control signal thereto.

19. The flight control system of claim 18, wherein said first REU is further configured to operate said actuator based on the first control signal and the third control signal when said second ACE fails to transmit a valid second control signal, wherein the third control signal is transmitted by said second REU to said first REU.

20. The flight control system of claim 15, further comprising an alternate communication link between said first REU and said second REU over which at least a portion of a control signal originating from an ACE may be transmitted.

* * * * *